United States Patent [19]

Placek

[11] Patent Number: 5,205,865
[45] Date of Patent: Apr. 27, 1993

[54] METHOD AND COMPOSITION FOR BONDING STYRENIC SURFACES

[75] Inventor: Douglas G. Placek, Fairless Hills, Pa.

[73] Assignee: FMC Corporation, Philadelphia, Pa.

[21] Appl. No.: 763,684

[22] Filed: Sep. 23, 1991

[51] Int. Cl.$^5$ ............................................. C08K 00/00
[52] U.S. Cl. ..................................................... 106/311
[58] Field of Search .......................................... 106/311

[56] References Cited

U.S. PATENT DOCUMENTS

| | | | |
|---|---|---|---|
| 1,950,954 | 3/1934 | Walsh et al. | 154/40 |
| 2,743,202 | 4/1956 | Amici | 148/6.14 |
| 3,468,467 | 9/1969 | Amberg | 229/1.5 |
| 3,681,166 | 8/1972 | Caiola et al. | 156/308 |
| 3,791,916 | 2/1974 | Eastes | 161/247 |
| 3,941,866 | 3/1976 | Ingraham | 264/135 |
| 4,574,020 | 3/1986 | Fosnaught | 156/264 |
| 4,654,105 | 3/1987 | Fesman | 156/308 |
| 4,661,188 | 4/1987 | Fumei | 156/244.11 |
| 4,671,836 | 6/1987 | Fumei | 156/215 |
| 4,735,668 | 4/1988 | Hoffmann et al. | 156/215 |

OTHER PUBLICATIONS

Schwartz et al., *Plastic Materials and Processes*, Van Nostrand Reinhold Co., 1982 (NY) pp. 786–787.

*Primary Examiner*—William R. Dixon, Jr.
*Assistant Examiner*—Margaret Einsmann
*Attorney, Agent, or Firm*—R. E. Elden; F. Ianno; R. L. Andersen

[57] ABSTRACT

A method is provided for forming a tacky surface area on a styrenic resin, such as a polystyrene label. A thin film is applied of an alkyl, aryl or alkaryl ester of a phosphorus oxyacid providing a tacky area suitable for bonding to another surface. A composition particularly useful for bonding polystyrene labels to bottles is a solid alkyl, aryl or alkaryl ester of a phosphorus oxyacid and a cosolvent selected from terpenoids and aromatic compounds having a flash point of at least 35° C. and a boiling point between 100° C. and 260° C.

6 Claims, No Drawings

METHOD AND COMPOSITION FOR BONDING STYRENIC SURFACES

The present invention relates to a method and a composition for bonding polystyrene to a surface. More particularly, the invention relates to bonding polystyrene labels to containers.

Polystyrene labels are widely used on food and beverage containers, particularly glass containers. The coated containers are substantially lighter than all glass containers because the walls of the containers can be thinner than conventional. As much as a third less glass than conventional is employed.

The coated glass containers have numerous advantages over the all glass containers. They are shatter-resistant, light-weight, and have the ability to run on standard bottling and handling equipment. Additionally, the plastic surface can be directly printed on, thereby eliminating the application of a label. The coated containers can be packed in corrugated containers without partitions and will resist breakage as well as standard glass containers packed with partitions. The light weight of the bottles also reduces shipping and handling costs. A still further advantage is that the coating, while permitting the bottles to run on conventional processing lines, reduces noise on the equipment. In addition, less breakage occurs during the filling operation which reduces overall cost and improves safety.

One type of plastic which is currently used for a label is foamed polystyrene which can be heat-shrunk onto a container. Such a label is frequently laminated or coated to reduce materials costs, to modify physical properties or to improve the container's appearance on the shelf.

Mechanical handling equipment that applies the labels often employs a plastic label sheet feed supply and a drum which moves the label into engagement with the outer surface of a container. The label is wrapped around the container by rolling it along a fixed surface. The label is glued to the container. The overlapped ends are also glued together by the glue applicator assembly.

Hot melt adhesives have been used to secure the labels to the container and to form a glued side seam when applied to the overlapped label ends. The use of the hot melt adhesive has been messy and expensive. Heat is required to melt the adhesive. There is a hazard of overheating or possible burning from heaters used to melt the glue. In addition, the label cannot be easily removed from the container and hence the body portion of the container is contaminated and cannot be readily relabeled.

Instead, U.S. Pat. No. 4,661,188 teaches applying a solvent to the polymer to form a viscous tacky solution of the polymer in the solvent sufficient to tack and bond the label to container during wrapping. After the label is wrapped around the container, the bond between the container and label becomes weaker as the solidifying solution hardens so that the label can be easily and cleanly stripped from the container either for relabeling or for recycling. Obviously, it is important that the solvent does not discolor or adversely affect the appearance of the label. Consequently, the solvents which are employed generally are very volatile to ensure that they do not penetrate the label sufficiently to affect its appearance.

Currently, polystyrene labels are applied to bottles with methylene chloride or methyl ethyl ketone as the solvents. These low boiling solvents tackify the label, allowing it to adhere both to the bottle and to itself. The use of these solvents represent serious health or fire risks to bottle plant personnel. In addition, the methylene chloride solvent evaporates after application, either on the bottling line or in the oven that heat shrinks the labels. The evaporated solvents cannot be exhausted to the atmosphere as they would result in an unacceptable volatile organic carbon (VOC) emission. If some of the evaporated solvent finds its way into the glass furnace it forms hydrochloric acid, which is corrosive to the furnace, and also must be scrubbed from the exhaust. MEK presents a fire hazard with its low flash point of 24° F. (−4° C.) and is considered toxic. All other chlorinated or low boiling solvents that work in this application present health or fire hazards that are undesirable.

U.S. Pat. No. 4,735,668 discloses that while the temporary bond between the label and glass created by a solvent, such as methylene chloride, is superior to one formed with hot glue, it is desirable to have a hot glue adhesive bond for the side seam or leading edge of the label. The patent teaches a separate machine is required to apply the two types of adhesive. However, the patent does not eliminate the problems of either adhesive system. Instead, it requires new machinery and retains the disadvantages of both the solvent adhesive and hot glue adhesive systems.

The present invention overcomes the problems of the prior art process by providing a method for forming a tacky surface area on a styrenic resin comprising applying to the area a thin film of a bonding compound selected from the group consisting of alkyl, aryl or alkaryl ester of a phosphorus oxyacid selected from the group consisting of phosphates, phosphites and phosphonates, forming thereby a tacky area on the styrenic resin suitable for bonding to another surface. The bonding compound is applied as a solution in a cosolvent for the styrenic resin, the cosolvent being miscible with the phosphorus oxyacid ester and having (a) a flash point greater than about 35° C. and (b) a boiling point between about 100° C. and about 260° C., particularly terpenoids, phenols, aryl esters, aryl ethers and aryl aldehydes.

For the purpose of this invention a styrenic resin comprises a polymer or copolymer comprising at least about 50% by weight polystyrene, and may include a foamed or unfoamed polystyrene manufacture; it may be a laminated or coextruded multilayered manufacture.

Esters of phosphorus oxyacids are not appreciably volatile below 100° C. and when applied to a styrenic surface the surface will remain tacky until it is cooled sufficiently to convert the liquid phase to a solid. Consequently, when the ester of a phosphorus oxyacid is applied to a polystyrene label it is desirable that the ester solidifies when the labeled container is cooled to room temperature after heat shrinking the label. This requires an ester which will solidify between about 35° C. and about 100° C., desirably between about 45° C. and about 65° C. Suitable esters include tri-o-chlorophenyl phosphate tris(2,4-dibromophenyl)phosphate, tris(2-bromophenyl)phosphate and triphenyl phosphate, triphenyl phosphate being highly preferred.

An ester of a normally-solid phosphorus oxyacid may be applied by melting, or by depressing its melting point by mixing with a cosolvent for the styrenic resin that has a flash point over about 37° C. and that is sufficiently volatile to evaporate at the temperature of heat shrinking (e.g. 260° C.). Suitable cosolvents should not be halogenated and should be nontoxic. In general terpenoids, phenols, aryl ethers, aryl esters and aryl aldehydes are suitable. Terpenoids include terpenes, sesquiterpenes and oxidized derivatives thereof. A suitable cosolvent can be easily selected by one skilled in the art without undue experimentation. A particularly desirable group of cosolvents are the terpenoid compounds consisting of two or three isoprene units, that is, with a formula of $(C_5H_8)_n$ in which n=2 or 3. Such terpenoid compounds may be monocyclic, dicyclic or acyclic compounds. Suitable terpenoids include, but are not limited to: dipentene, l-limonene, d-limonene, citral, pinene, carvone, citronellal, myrcene. The terms dipentene or limonene include d-limonene, l-limonene and mixtures of the two. Various other terpenoids include, but are not limited to: ocimene, linalool, phellandrene, carvacrol, thymol. Many commercially available terpenoids are alcohols derived from terpenes. Sesquiterpenes that are suitable include, but are not limited to: cadinene, and caryophyllene. The nontoxic aromatic hydrocarbons include: anisole, methyl phenyl ethyl ether, cinnamic aldehyde, methyl benzyl acetate, methyl benzyl alcohol, benzyl butyrate, benzyl proprionate, anethole, and methyl benzyl ether.

It is particularly surprising that high boiling solvents, such as terpenoid solvents, could be employed in the process because when used alone such high boiling solvents may continue to solubilize and degrade the label for several hours after application. The labels become cracked and discolored, which is unacceptable. On the other hand a triphenyl phosphate/terpene blend usually solidifies on cooling to stop further attack by the cosolvent.

For the purpose of this invention a high boiling solvent has a normal boiling point of about 100° C. to 260° C., preferably about 130° C. to about 250° C. and has a flash point of at least about 37° C.

Having described the best mode of practicing the invention, the following examples are presented to illustrate the invention and are not intended to limit the scope thereof.

EXAMPLE 1

Triphenyl phosphate (TPP) alone

Hot, molten triphenyl phosphate (TPP) with a melting point of 50° C. was applied to a label. The hot liquid TPP solubilized the polystyrene at a much quicker rate than phosphate esters that are normally liquid and applied at room temperature. In addition, when the thin film of molten liquid came in contact with the cool glass bottle, it solidified and formed a tenacious bond. The labels could be peeled from the bond leaving no residue. TPP could also be used in other polystyrene applications where sealing or adhesion is required.

However, the polystyrene labels used by the bottling industry often have a polypropylene film on them to provide gloss and reduce friction on the bottling line. This polypropylene film slowed the solvent action of the TPP too much to be useful with the high speed automated labeling equipment of choice.

EXAMPLE 2

TPP/solvent blends

Blends of FMC Corporation's Kronitex ® TPP and d-limonene were prepared. The blends were heated to 38° C. and thin layers were brushed onto labels and were immediately applied to bottles. The bottles were then placed in an oven at 232° C. for 60 seconds to shrink fit the labels. The labels did not peel away from the bottles during the heat treatment. After cooling for 30 minutes, the bottles were subjected to a hot fill test in which the labeled bottles were exposed to 88° C. water vapor for 3 minutes, immersed in 88° C. water for 10 minutes, and immersed in 27° C. water for 30 minutes. Compositions and results are presented as Table I.

The 50:50 and 75:25 mixtures of TPP and cosolvent both provided excellent label adhesion, a water and heat stable bond, and were not detrimental to the labels, appearance. Labels applied with these solvent mixtures could be easily torn from the bottles, and left no residue on the glass surface. The label seam loosened with 90:10 blend of TPP and cosolvent, but the label still adhered to the bottle.

EXAMPLE 3

A group of potential "solvents" were screened by brushing them onto a polystyrene label. (The solvents were heated above their melting point if necessary to liquify them.) Those that created a tacky surface were further evaluated by heat shrinking the label to the bottle. The results are presented as Table II.

Any of the solvents in the first column (marked "worked well") were found to form a less volatile mixture by blending as a cosolvent with triphenyl phosphate, the 50/50 blends being particularly desirable because they retained the rapid performance of the cosolvent.

TABLE I

| TPP BLEND WITH d-LIMONENE COSOLVENT | | | | |
|---|---|---|---|---|
| TPP/Cosolvent Ratio (wt.) | °C. mp | Flash | Instant Tackifying | Hot Fill Test |
| 50:50 | 32 | 63 | yes | passes |
| 75:25 | 35 | 68 | yes | passes |
| 90:10 | nd | nd | yes | * |

*label seam loosened but still adhered to bottle.
nd = not determined

TABLE II

| EVALUATION OF SOLVENTS AS POLYSTYRENE ADHESIVES | | |
|---|---|---|
| Worked Well | Worked Slowly | Did Not Work |
| Anisole | Citral | Citronellol |
| Limonene (Dipentene) | Cinnamic Aldehyde | Patchone (Isopropyl Cyclohexanol) |
| Citronellal | Eugenol | Dibutyl Phthalate |
| Phellandrene | Phenoxy-2-propanone | Turpineol |
| Ocimene | 2-t-butyl phenol | Cyclohexane |
| Anethole | 2,6-isopropyl phenol | Di-n-octyl Phthalate |
| | Triphenyl Phosphate | Dimyrcene |
| | Trialkyl Phosphates | Cumylphenyl Acetate |
| | Triaryl Phosphates | Cumylphenyl Benzoate |
| | Alkyl Phosphonates | Biscumylphenyl Isophthalate |
| | Pinene | Dicyclohexyl Phthalate |
| | Cresol | Glycerol |
| | | Resorcinol Diphosphate |
| | | Tri(dichloropropyl) Phosphate |
| | | Tri-chloropropyl phosphate |
| | | BHT (di-t-butyl-p-cresol) |
| | | Caryophyllene |
| | | Camphene |

I claim:

1. A composition for forming a tacky surface area on a styrenic resin, the composition comprising a first solvent a solid alkyl, aryl or alkaryl ester of a phosphorus oxyacid, and a sufficient amount of a cosolvent for the styrenic resin to maintain the composition as a liquid at the temperature of application to the surface of a styrenic resin, thereby providing a tacky area on the surface suitable for bonding the tacky area to another surface, wherein the cosolvent has a flash point of at least 35° C., and a boiling point between about 100° C. and about 260° C. and is a terpenoid compound or an oxidized derivative thereof, the terpenoid compound consisting of two or three isoprene structural units (($C_5H_{10}$)$_n$ where n=2 or 3), and wherein the ester of the phosphorus oxyacid is selected from the group consisting of phosphates, phosphites and phosphonates.

2. The composition of claim 1 wherein the ester of the phosphorus oxyacid is triphenyl phosphate.

3. The composition of claim 1 wherein the cosolvent is dipentene.

4. The composition of claim 2 wherein the cosolvent is dipentene.

5. The composition of claim 1 wherein the composition comprises about 25 to 75 parts by weight of an ester of a phosphorus oxyacid and about 75 to 25 parts by weight cosolvent.

6. The composition of claim 1 wherein the composition comprises about 25 to 75 parts by weight of triphenyl phosphate and 75 to 25 parts by weight dipentene.

* * * * *